United States Patent
Kapoor et al.

(10) Patent No.: US 10,467,635 B1
(45) Date of Patent: Nov. 5, 2019

(54) EFFICIENT CROSS CUSTOMER ANALYTICS

(71) Applicant: Numerify, Inc., Cupertino, CA (US)

(72) Inventors: Rahul Kapoor, Sunnyvale, CA (US); Renu Chintalapati, San Ramon, CA (US)

(73) Assignee: NUMERIFY, INC., San Jose, CA (US)

( * ) Notice: Subject to any disclaimer, the term of this patent is extended or adjusted under 35 U.S.C. 154(b) by 526 days.

(21) Appl. No.: 15/009,076

(22) Filed: Jan. 28, 2016

(51) Int. Cl.
*G06Q 30/02* (2012.01)
*G06F 16/23* (2019.01)

(52) U.S. Cl.
CPC ..... *G06Q 30/0201* (2013.01); *G06F 16/2322* (2019.01)

(58) Field of Classification Search
CPC .............. G06Q 30/0201; G06F 16/2322
See application file for complete search history.

(56) References Cited

U.S. PATENT DOCUMENTS

| | | | |
|---|---|---|---|
| 5,734,837 A * | 3/1998 | Flores ............. | G06Q 10/06311 705/7.13 |
| 8,200,527 B1 * | 6/2012 | Thompson ......... | G06Q 10/0639 705/7.38 |
| 8,209,218 B1 * | 6/2012 | Basu ................. | G06Q 10/0637 705/7.36 |
| 8,214,238 B1 * | 7/2012 | Fairfield ........... | G06Q 10/063 705/7.11 |
| 8,504,408 B2 | 8/2013 | Banthia et al. | |
| 8,606,623 B1 | 12/2013 | Bittinger et al. | |
| 2002/0194329 A1 | 12/2002 | Ailing | |
| 2003/0083947 A1 * | 5/2003 | Hoffman ........... | G06Q 10/06 705/22 |
| 2006/0074732 A1 * | 4/2006 | Shukla .............. | G06F 8/36 717/106 |
| 2006/0143220 A1 * | 6/2006 | Spencer, Jr. ....... | G06F 8/20 |

(Continued)

FOREIGN PATENT DOCUMENTS

WO    WO2000068861 A2    11/2000

OTHER PUBLICATIONS

Impact analysis of database schema changes A Maule, W Emmerich, DS Rosenblum—Proceedings of the 30th . . . , 2008—dl.acm.org (Year: 2008).*

(Continued)

*Primary Examiner* — Jonathan G Sterrett
(74) *Attorney, Agent, or Firm* — Rahman LLC

(57) ABSTRACT

A method for automatically determining one or more cross customer metrics from a cross customer store for cross customer analytics is provided. The method includes the steps of: (i) automatically standardizing dimensions associated with the one or more customers to create one or more cross customer metrics; (ii) automatically determining incremental data from one or more customer specific stores by tracking (a) a time stamp of a last pull time (T) for customer data stored in the one or more customer specific stores, and (b) a number of items involved (I); (iii) automatically updating the one or more cross customer metrics in the cross customer store with the incremental data; and (iv) automatically comparing the one or more cross customer metrics of a customer with one or more peer groups created at run time based on customer selected values for one or more parameters.

13 Claims, 10 Drawing Sheets

(56) References Cited

U.S. PATENT DOCUMENTS

| | | | |
|---|---|---|---|
| 2008/0319829 A1* | 12/2008 | Hunt | G06Q 30/02 |
| | | | 705/7.29 |
| 2009/0265335 A1* | 10/2009 | Hoffman | G06F 17/30592 |
| 2010/0070448 A1* | 3/2010 | Omoigui | H01L 27/1463 |
| | | | 706/47 |
| 2011/0106610 A1* | 5/2011 | Landis | G06Q 30/02 |
| | | | 705/14.39 |
| 2012/0233547 A1* | 9/2012 | McLachlan | G06Q 10/06 |
| | | | 715/733 |
| 2013/0339089 A1* | 12/2013 | Olsen | G06Q 30/0202 |
| | | | 705/7.31 |
| 2014/0200968 A1 | 7/2014 | Yoder et al. | |
| 2015/0100426 A1* | 4/2015 | Hartzell | H04W 4/21 |
| | | | 705/14.58 |

OTHER PUBLICATIONS

A Multi-Agent Framework for Distributed Business Intelligence Systems A Loebbert, G Finnie—System Science (HICSS), 2012 45th . . . , 2012—ieeexplore.ieee.org (Year: 2012).*

* cited by examiner

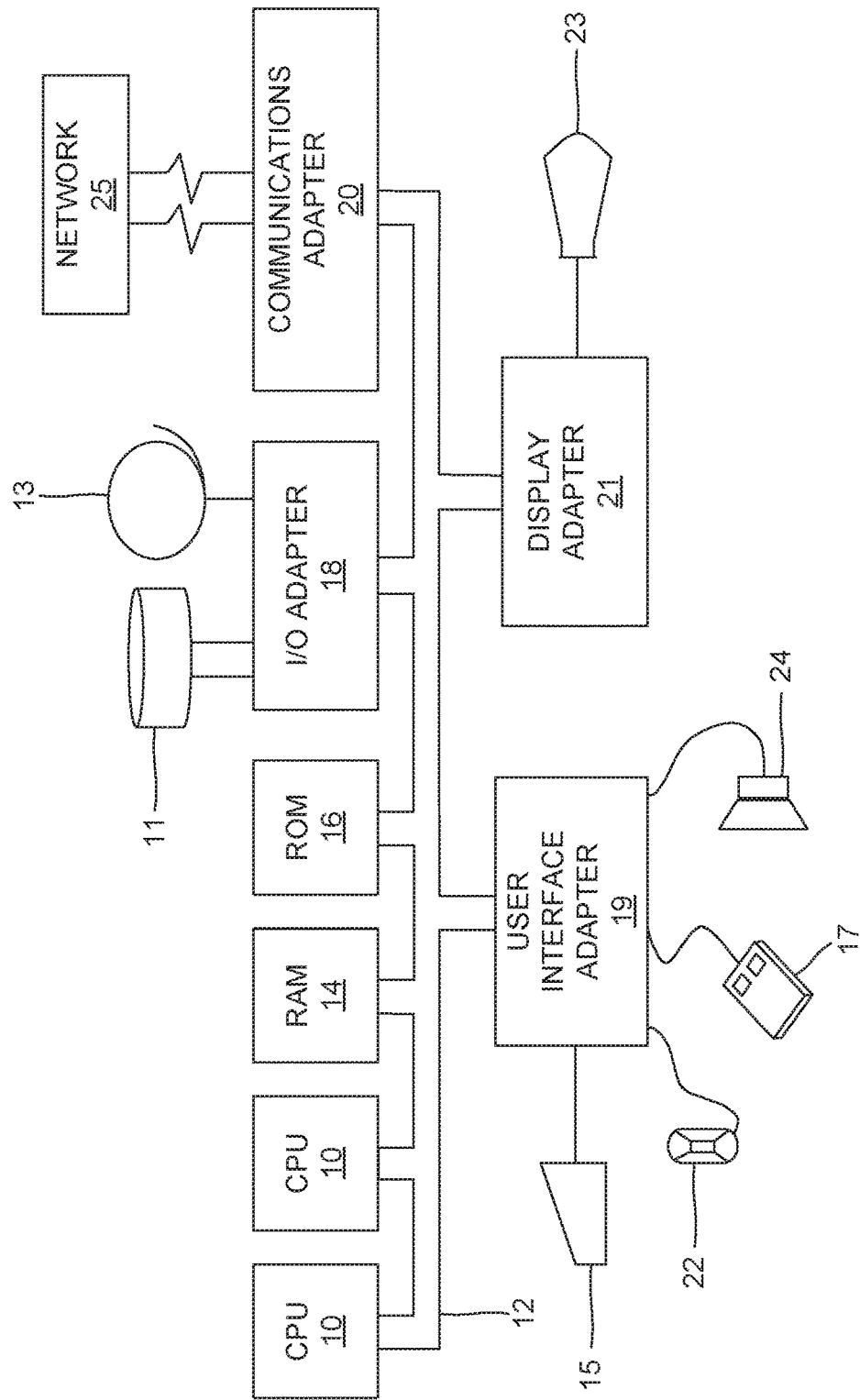

EFFICIENT CROSS CUSTOMER ANALYTICS

BACKGROUND

Technical Field

The embodiments herein generally relate to management, analysis and reporting of data across various data sources, and more specifically to a system and method for providing efficient customer analytics solution integrated with statistical models and business reports to an enterprise.

Description of the Related Art

There are many factors that may be analyzed to assess the health of an organization. One could look to a stock price or net profits to determine the financial stability of a given organization. As used herein, the term "organization" is intended to include, but is not limited to, a company, corporation, entity, individual, or the like. Another method for assessing the vitality of an organization is to compare the performance of the organization against like organizations. A comparison between like organizations may provide a more accurate representation of an organization's performance than a stock price or net profit, which may fluctuate as a result of general market trends.

Furthermore, a comparison of like organizations may allow for industry specific characteristics to be addressed. For example, IT Service department managers may want to know a percentage of incidents resolved on the first call, or a difference in the average time to resolve incidents in their organization, as compared to other organizations within the industry. Similarly, IT Asset Managers may want to know how their average asset costs per employee, or a life expectancy of different asset classes, or a percentage of warranty honored requests in the organization, are compared to other organizations within the industry. In another example, in the industries like pharmaceutical industry where most sales are secured through sales representatives directly visiting health care providers, it may be helpful to determine how an organization's profit per sales representative compares to the industry average. Alternatively, in an industry with heavy research and development, a company's strength could be gauged based upon the amount of investment in research and development, as compared to other organizations within the industry. Comparing metrics across peers (i.e. other organizations within the industry) is not only useful for understanding how a company is performing compared to its peer group, but also used to get insights like changes to expect as the company grows.

Comparing data across organizations to come up with comparable metrics is very difficult because organization's data values are stored at different places and are not directly comparable. First, if the organization's data is on premise getting it into a common model, to a common place for cross customer analysis is very difficult because the organization's data are stored in different places in diverse models using different technologies. If the organizations have a data warehouse with similar dimensional models that describes the data, then the aggregation of the organization's data is simplified. If the organizations share a data warehousing software vendor, who has a cloud based data warehouse offering with different customer's data coexisting in a common store with underlying data model, it is relatively easier for the data warehousing software vendor to provide products and services comparing different customer datasets.

Even with the common data warehousing software vendor who has the data for different customer organizations, problems like bucketing organizations into comparable "peer" groups, computing meaningful metrics for each domain (like IT or Marketing) that different customers would care about, and computing comparable metrics across customers still remain.

Further in a common store model, the aggregated cross customer metrics associated with different customer organizations may be stored with (i) individual customer data points without customer specific information associated with the data points (storing individual data points in the common store allows charting those data points from one store instead of multiple stores), or (ii) customer data points associated with customer specific information (storing customer specific information in the common store facilitates presentation of customer vs. peer group metrics from one store instead of two).

However, given that this information may be valuable to competitors; many organizations maintain such sensitive information in confidence. As a result, it is often difficult to determine industry comparatives. Returning to the examples above, an organization may not share the amount invested in research for fear that transparent exposure of such information could be utilized by competitors in an adverse fashion. In instances where an industry is comprised of non-publicly traded companies lacking regulatory reporting requirements, gathering such information may be further burdensome.

Despite concerns regarding the public release of such sensitive information, many organizations realize the benefit of aggregating such information. Gathering data specific to a given industry may allow for the creation of industry benchmarks. These benchmarks may be utilized by organizations to gauge their performance within a specific industry.

As a result, organizations may benefit from sharing organization specific information wherein the information cannot be effectively linked to the specific source so the competitors cannot identify individual organization data points. In addition, organizations require an effective method of displaying such information.

Accordingly, there remains a need for a system and method for aggregating industry specific information and displaying such information without divulging the specific source of the information.

SUMMARY

In view of the foregoing, an embodiment herein provides one or more non-transitory computer readable storage mediums storing one or more sequences of instructions, which when executed by one or more processors, to perform a method of automatically determining cross customer metrics from a cross customer store for cross customer analytics is provided. The method includes the steps of: (i) storing one or more cross customer metrics in a cross customer store by aggregating data from one or more customer specific stores without storing customer specific identifiers or customer specific data points in the cross customer store; (ii) automatically determining incremental data from the one or more customer specific stores by tracking (a) a time stamp of a last pull time (T) for one or more customer data values stored in the one or more customer specific stores, and (b) a number of items involved (I); (iii) automatically updating the one or more cross customer metrics in the cross customer store with the incremental data; (iv) determining one or more parameters selected from a kind of application used, and at least one of (a) an industry, (b) a geography, (c) a customer size in terms of employees, (d) a revenue, and (e) relevant data volumes associated with one or more customers when the one or more customers are setup; (v) automatically comparing the one or more cross customer metrics of a customer with one or more peer groups created at run time based on customer selected values for the one or more parameters while ensuring the number of customers in each peer group exceeds a minimum threshold value, and (vi) automatically computing a list of customer specific stores based on the one or more parameters to (a) retrieve one or more customer specific facts from the list of customer specific stores, and (b) compute the one or more cross customer metrics at run time for the list of customer specific stores.

In one embodiment, the method includes the steps of automatically (i) determining data points for the relevant data volumes associated with the one or more customer data, (ii) creating the one or more peer groups, using standard clustering algorithms to segment the one or more customers into the peer groups based on identified clusters of data points, and (iii) updating (a) the one or more cross customer metrics, and (b) the one or more peer groups in the cross customer store when a new customer is setup.

In another embodiment, the method includes the step of (i) automatically standardizing dimensions associated with the one or more customers based on at least one of (a) a numeric ranking scheme, or (b) a workflow representation aspect to create one or more comparable cross customer metrics, (ii) automatically standardizing the numeric ranking scheme across the one or more customers by (a) determining a standard numeric ranking scheme that is compact across the one or more customers, (b) mapping non-standard numeric ranking schemes to the standard numeric ranking scheme, based on an analysis of value distributions in the non-standard numeric ranking schemes, to create groupings in the non-standard numeric ranking schemes by identifying an average value distribution of values in the standard numeric ranking scheme, and identifying a grouping that brings the non-standard numeric ranking schemes similar to the standard numeric ranking scheme in terms of value distributions, and (iii) automatically standardizing the workflow representation aspects across the one or more customers by (a) determining a closed versus active state for workflows for standardizing closed to active transitions, (b) standardizing duration determination for workflows, and (c) standardizing determination of ownership changes for workflows across the one or more customers. The method further includes the step of (i) automatically determining the closed workflow state by identifying at least one of (a) an explicit enumerated value of attributes associated with the closed workflow state, or (b) a workflow state attribute value without any updates to workflow records, (ii) automatically determining how duration of workflows is represented across the one or more customers by identifying at least one of (a) a start time and an end time, (b) a start time and a duration, (c) an end time and a duration, or (d) a duration associated with workflows for each customer, and (iii) automatically determining the ownership changes for workflows across the one or more customers by identifying for each customer a string column that captures a name representing owners of workflows, or an id/a foreign key to a record that captures a name representing owners of workflows.

In yet another embodiment, the method includes the steps of (A) automatically determining N new items associated with the incremental data, (B) at least one of (a) automatically updating existing minimum or maximum metrics by comparing the existing minimum or maximum metrics with the N new items; (b) automatically updating existing sum metrics by adding the N new items; (c) automatically updating existing count metrics by adding the number (N) of new items; or (d) automatically updating existing average metrics by computing an average with the N new items by dividing a sum of (i) a product of existing average and the number of items involved (I), and (ii) a sum of the N new items, with the sum of the number of the N new items and the number of items (I); and (C) automatically incrementing the number of items (I) by the number of N new items.

In yet another embodiment, the method includes the steps of automatically determining U updated items associated with the incremental data, and at least one of (a) automatically updating the existing sum metrics by subtracting a sum of old values of the U updated items and adding a sum of new values of the U updated items to the existing sum; (b) automatically updating existing minimum or maximum metrics by (i) comparing existing minimum or maximum values if existing minimum or maximum values are not updated, with the new values of the U updated items, or (ii) comparing updated values of the minimum or maximum items with a first minimum or maximum, stored as part of an ordered list of preconfigured number of next minimums and maximums, and based on the comparison, automatically updating a minimum or maximum value to the updated value of the minimum or maximum items, or to the first of the ordered list of stored next minimums or maximums while updating the ordered list to remove the first stored minimum or maximum; or (c) automatically updating the existing average metrics by computing an average with the U updated items by dividing a difference of (i) a product of the existing average and the number of items involved (I) and the sum of new values of the U updated items, and (ii) the sum of old values of the U updated items, with the number of items (I).

In yet another embodiment, the method includes the steps of (A) automatically determining D deleted items associated with the incremental data, (B) at least one of (a) automatically updating the existing sum metrics by subtracting a sum of D deleted items; (b) automatically updating the existing minimum or maximum metrics, when the minimum or maximum value is deleted, by removing a first of the ordered list of stored next minimum and maximum values, and setting the first removed stored minimum or maximum as the new minimum or maximum metric value; (c) automatically updating the existing count metrics by subtracting the number of D deleted items; or (d) automatically updating the existing average metrics by computing an average with the D deleted items by dividing a difference of (i) a product of the existing average and the number of items involved (I), and (ii) the sum of deleted values of the D deleted items, with a difference of the number of items (I) and the number of D deleted items; and (C) automatically decrementing the number of items (I) by the number of the deleted items D.

In yet another embodiment, the method includes the steps of (i) automatically updating a counter array tracking each items count, with the N new items by (a) adding ND new distinct values associated with the N new items, and (b) incrementing a count for existing values; (ii) automatically updating existing count distinct metrics by incrementing the count distinct with a number of ND new distinct values; (iii) automatically updating existing sum distinct metrics by incrementing the sum distinct with a sum of the ND new distinct values; (iv) automatically updating existing average distinct metrics by dividing a sum of (a) a product of the average distinct and a count of total distinct values (ID), and (b) a sum of the ND new distinct values, with the sum of the number of ND new distinct values, and the count of total distinct values (ID); and (v) automatically updating the count of previous total distinct values (ID) by incrementing with the number of ND new distinct values.

In yet another embodiment, the method includes the steps of (i) automatically updating the counter array tracking each items count, with the U updated items by (a) adding new values associated with the U updated items, (b) incrementing a count of existing values, (c) decrementing a count of removed values, and (d) tracking the ND new distinct values and DD deleted distinct values; (ii) automatically updating the existing count distinct metrics by (a) incrementing with the number of ND new distinct values, and (b) decrementing by a number of DD deleted distinct values to obtain a new count distinct; (iii) automatically updating the existing sum distinct metrics by (a) reducing a sum of DD deleted distinct values and (b) adding a sum of the ND new distinct values associated with the U updated items; (iv) automatically updating the existing average distinct metrics by dividing a difference of (a) a product of the existing average distinct and the count of total distinct values (ID), and a sum of the ND new distinct values, and (b) a sum of the DD deleted distinct values associated with the U updated items, with the new count distinct; and (v) automatically updating the count of previous total distinct values (ID) by (a) incrementing with the number of ND new distinct values, and (b) decrementing with the number of DD deleted distinct values.

In yet another embodiment, the method includes the steps of (i) automatically updating the counter array tracking each items count, by (a) decrementing the count of the removed values, and (b) tracking the DD deleted distinct values where the count drops to 0; (ii) automatically updating the existing count distinct metrics by decrementing the count of the DD deleted distinct values; (iii) automatically updating the existing sum distinct metrics by decrementing the sum of the DD distinct deleted values; (iv) automatically updating the existing average distinct metrics by dividing a difference of (a) a product of the existing average distinct and the count of total distinct values (ID), and (b) a sum of the DD deleted distinct values, with a difference of the count of total distinct values (ID) and the DD deleted values; and (v) automatically updating the count of previous total distinct values (ID) by decrementing with the number of DD deleted distinct values.

In one aspect, an automated cross customer analytics system that determines cross customer metrics from a cross customer store for cross customer analytics is provided. The automated cross customer analytics system includes a memory unit, a display unit, and a processor. The memory unit stores a database and a set of modules. The database stores across customer store that tracks one or more cross customer metrics captured using a star schema. The processor executes the set of modules. The set of modules includes a dimension standardization module, an incremental data determination module, and an incremental data updation module. The dimension standardization module automatically standardizes dimensions associated with one or more customers based on at least one of (a) a numeric ranking scheme, or (b) a workflow representation aspect to create one or more comparable cross customer metrics for cross customer analytics. The dimension standardization module automatically standardizes the workflow representation aspects by (i) determining a closed versus active state for workflows for standardizing closed to active transitions, (ii) standardizing duration determination for workflows, and (iii) standardizing determination of ownership changes for workflows across the one or more customers. The incremental data determination module automatically determines incremental data from one or more customer specific stores by tracking (a) a time stamp of a last pull time (T) for one or more customer data values stored in the one or more customer specific stores, and (b) a number of items involved (I). The incremental data updation module automatically updates the one or more cross customer metrics in the cross customer store with the incremental data.

In one embodiment, the dimension standardization module automatically standardizes the numeric ranking scheme across the one or more customers by (i) determining a standard numeric ranking scheme that is compact across the one or more customers, (ii) mapping non-standard numeric ranking schemes to the standard numeric ranking scheme, based on an analysis of value distributions in the non-standard numeric ranking schemes, to create groupings in the non-standard numeric ranking schemes by (a) identifying an average value distribution of values in the standard numeric ranking scheme, and (b) identifying a grouping that brings the non-standard numeric ranking schemes similar to the standard numeric ranking scheme in terms of value distributions. In another embodiment, the dimension standardization module automatically determines at least one of (i) the closed workflow state by identifying for each customer at least one of (a) an explicit enumerated value of attributes associated with the closed workflow state, or (b) a workflow state attribute value without any updates to workflow records, (ii) how duration of workflows is represented across the one or more customers by identifying at least one of (a) a start time and an end time, (b) a start time and a duration, (c) an end time and a duration, or (d) a duration associated with workflows for each customer, and (iii) an ownership change for workflows across the one or more customers by identifying for each customer a string column that captures a name representing owners of workflows, or an id/a foreign key to a record that captures a name representing owners of workflows.

In yet another embodiment, the automated cross customer analytics system includes a peer groups creation module that automatically creates one or more peer groups at run time based on one or more parameters selected from (i) a kind of application used, and (ii) at least one of (a) an industry, (b) a geography, (c) a customer size in terms of employees, (d) a revenue, or (e) relevant data volumes associated with each of the one or more customers when the customers are setup. In yet another embodiment, the peer groups creation module automatically (i) determines data points for the relevant data volumes associated with the one or more customer data, (ii) creates the one or more peer groups, using standard clustering algorithms to segment the one or more customers into the peer groups based on identified clusters of data points, and (iii) computes a list of customer specific stores based on the one or more parameters to (a) retrieve one or more customer specific facts from the list of customer specific stores, and (b) compute the one or more cross customer metrics at run time for the list of customer specific stores. The automated cross customer analytics system includes a cross customer metrics comparison module that automatically compares the one or more cross customer metrics of a customer with at least one peer group selected from the one or more peer groups for cross customer analytics while ensuring that the one or more peer groups includes a number of customers that exceeds a minimum threshold value.

In another aspect, a computer implemented method for automatically determining one or more cross customer metrics from a cross customer store for cross customer analytics is provided. The computer implemented method includes the steps of: (i) automatically standardizing dimensions associated with one or more customers based on at least one of (a) a numeric ranking scheme, or (b) a workflow representation aspect to create one or more cross customer metrics; (ii) determining one or more parameters selected from a kind of application used, and one or more of (a) an industry, (b) a geography, (c) a customer size in terms of employees, (d) a revenue, and (e) relevant data volumes associated with one or more customers when the one or more customers are setup; (iii) automatically comparing the one or more cross customer metrics of a customer with one or more peer groups created at run time based on customer selected values for the one or more parameters while ensuring that the number of customers in the one or more peer groups exceeds a minimum threshold value; (iv) storing one or more cross customer metrics in a cross customer store by aggregating data from one or more customer specific stores without storing customer specific identifiers or customer specific data points in the cross customer store; (v) automatically determining incremental data from the one or more customer specific stores by tracking (a) a time stamp of a last pull time (T) for one or more customer data values stored in the one or more customer specific stores, and (b) a number of items involved (I); and (vi) automatically updating the one or more cross customer metrics in the cross customer store with the incremental data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 10 is a computer system used in accordance with the embodiments herein.

DETAILED DESCRIPTION OF PREFERRED EMBODIMENTS

Figure 1:
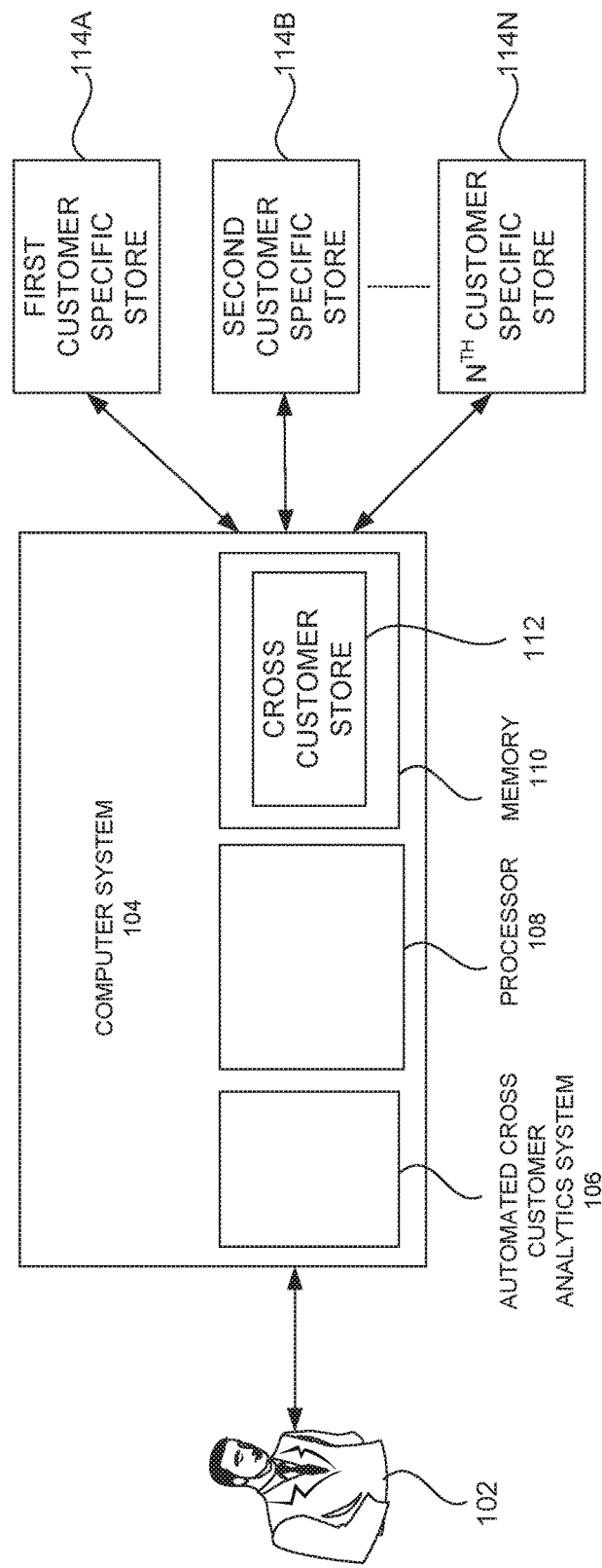
FIG. 1 is a system view illustrating a user interacting with an automated cross customer analytics system using a computer system for efficient cross customer analytics according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide a system for aggregating industry specific information and displaying such information without divulging the specific source of the information. The system may (i) store one or more cross customer metrics in a cross customer store by aggregating data from one or more customer specific stores without storing customer specific identifiers or customer specific data points in the cross customer store, (ii) compare the one or more cross customer metrics of a customer with one or more peer groups created at run time based on customer selected values for the plurality of parameters. Referring now to the drawings, and more particularly to FIGS. 1 through 10, where similar reference characters denote corresponding features consistently throughout the figures, preferred embodiments are shown.

FIG. 1 is a system view illustrating a user 102 interacting with an automated cross customer analytics system 106 using a computer system 104 for efficient cross customer analytics according to an embodiment herein. The computer system 104 further includes a memory 110 that stores instructions and a processor 108 configured by the instructions to execute the automated cross customer analytics system 106. The memory/storage 110 further includes a database that stores a cross customer store 112 to track one or more cross customer metrics captured using a star schema. The automated cross customer analytics system 106 stores the one or more cross customer metrics in the cross customer store 112 by aggregating data from one or more customer specific stores 114A-N, without storing customer specific identifiers or customer specific data points in the cross customer store 112. In one embodiment, the automated cross customer analytics system 106 stores the one or more aggregated metrics in a star schema by aggregating data from one or more customer data warehouses. The automated cross customer analytics system 106 automatically standardizes dimensions associated with one or more customers based on a numeric ranking scheme, or a workflow representation aspect to create one or more comparable cross customer metrics for cross customer analytics. In one embodiment, the automated cross customer analytics system 106 automatically standardizes the workflow representation aspects by (i) determining a closed versus active state for workflows for standardizing closed to active transitions, (ii) standardizing duration determination for workflows, and (iii) standardizing determination of ownership changes for workflows across the one or more customers to create one or more comparable cross customer metrics for cross customer analytics.

The automated cross customer analytics system 106 further determines one or more parameters such as a kind of application used, an industry, a geography, a customer size in terms of employees, a revenue, or relevant data volumes associated with one or more customers when the one or more customers are setup. The automated cross customer analytics system 106 automatically creates one or more peer groups at run time based on the one or more parameters such as a kind of application used, an industry, a geography, a customer size in terms of employees, a revenue, or relevant data volumes associated with each of one or more customers while ensuring that the one or more peer groups include a number of customers that exceeds a minimum threshold value. The automated cross customer analytics system 106 automatically compares the one or more cross customer metrics of a customer with the one or more peer groups created at run time based on customer selected values (e.g., a particular geography, a certain set of industries, etc.) for the one or more parameters.

The automated cross customer analytics system 106 further determines incremental data from the one or more customer specific stores 114A-N by tracking a time stamp of a last pull time (T) for one or more customer data values stored in the one or more customer specific stores 114A-N, and a number of items involved (I). The automated cross customer analytics system 106 automatically updates the one or more cross customer metrics in the cross customer store 112 with the incremental data. In one embodiment, the automated cross customer analytics system 106 updates the incremental data in the cross customer store 112 and the one or more customer specific stores 114A-N. In one embodiment, the automated cross customer analytics system 106 stores an average, a minimum, a maximum and a median value across the customers in the cross customer store 112.

Figure 2:
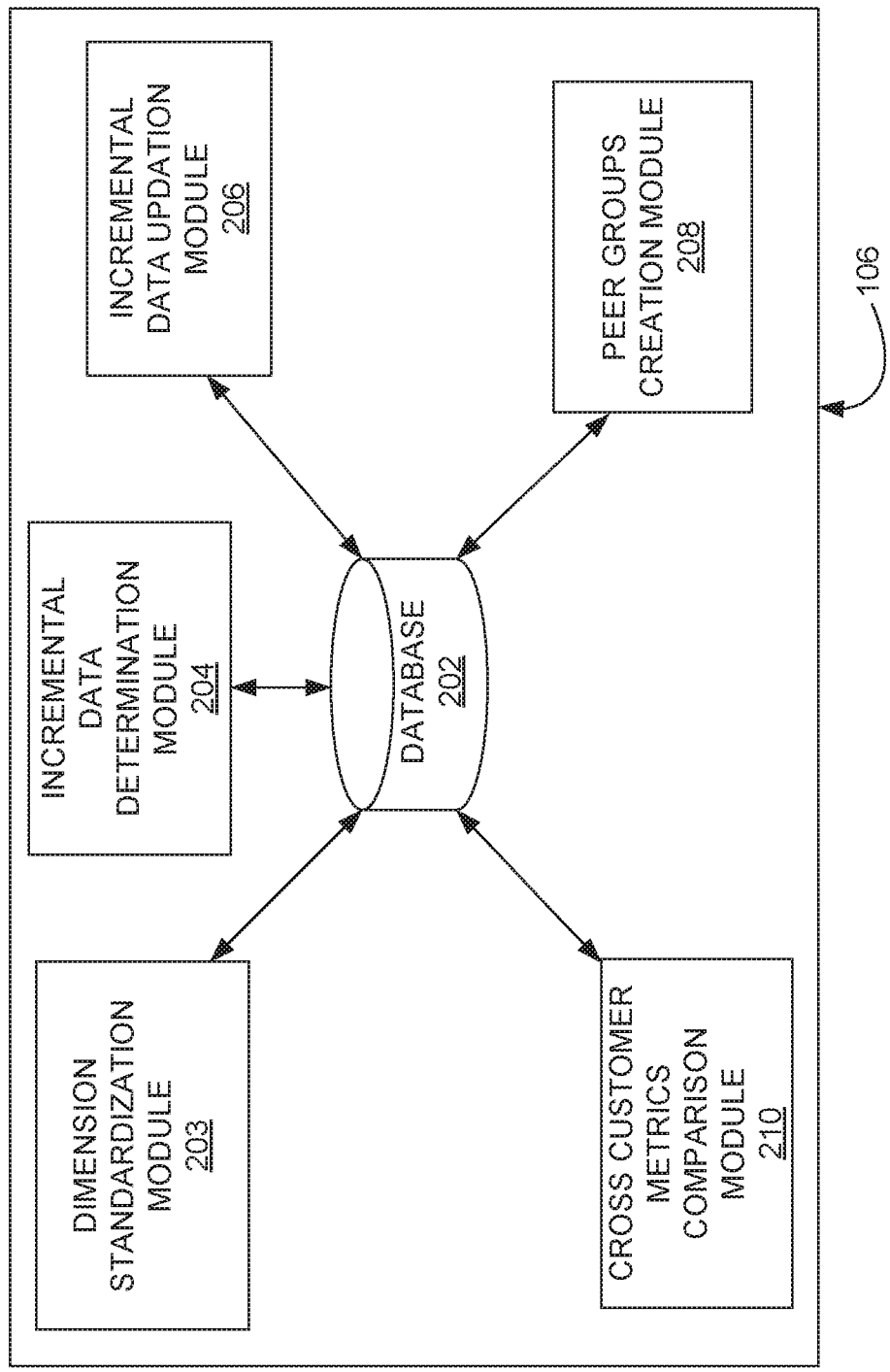
FIG. 2 illustrates an exploded view of the automated cross customer analytics system of FIG. 1 according to an embodiment herein.

FIG. 2 illustrates an exploded view of the automated cross customer analytics system 106 of FIG. 1 according to an embodiment herein. The automated cross customer analytics system 106 includes a database 202, a dimension standardization module 203, an incremental data determination module 204, an incremental data updation module 206, a peer groups creation module 208, and a cross customer metrics comparison module 210. The database 202 stores the one or more cross customer metrics in the cross customer store 112 by aggregating data from the one or more customer specific stores 114A-N, without storing customer specific identifiers or customer specific data points in the cross customer store 112.

The dimension standardization module 203 is configured to automatically standardize dimensions associated with the one or more customers at the cross customer store 112 based on a numeric ranking scheme, or a workflow representation aspect to create one or more comparable cross customer metrics for cross customer analytics. The dimension standardization module 203 automatically standardizes the workflow representation aspects across the one or more customers by (i) determining a closed versus active state for workflows for standardizing closed to active transitions, (ii) standardizing duration determination for workflows, and (iii) standardizing determination of ownership changes for workflows across the one or more customers. In one embodiment, the dimension standardization module 203 automatically standardizes the numeric ranking scheme across the one or more customers by (i) determining a standard numeric ranking scheme that is compact across the one or more customers, (ii) mapping non-standard numeric ranking schemes to the standard numeric ranking scheme, based on an analysis of value distributions in the non-standard numeric ranking schemes, to create groupings in the non-standard numeric ranking schemes by (a) identifying an average value distribution of values in the standard numeric ranking scheme, and (b) identifying a grouping that brings the non-standard numeric ranking schemes similar to the standard numeric ranking scheme in terms of value distributions.

In another embodiment, the dimension standardization module 203 automatically determines the closed workflow state by identifying an explicit enumerated value of attributes associated with the closed workflow state, or a workflow state attribute value without any updates to workflow records. The dimension standardization module 203 automatically determines how duration of workflows is represented across the one or more customers by identifying a start time and an end time, a start time and a duration, an end time and a duration, or a duration associated with workflows for each customer. The dimension standardization module 203 may automatically determine an ownership change for workflows across the one or more customers by identifying for each customer a string column that captures a name representing owners of workflows, or an id/a foreign key to a record that captures a name representing owners of workflows. The dimension standardization module 203 may automatically create one or more comparable cross customer metrics by standardizing dimensions associated with the one or more customers based on a numeric scheme (e.g., a priority/severity scheme), or a workflow state.

The incremental data determination module 204 is configured to automatically determine incremental data from the one or more customer specific stores 114A-N by tracking a time stamp of a last pull time (T) for one or more customer data values stored in the one or more customer specific stores 114A-N, and a number of items involved (I). The incremental data updation module 206 is configured to automatically update the one or more cross customer metrics in the cross customer store 112 with the incremental data. The incremental data updation module 206 automatically tracks the number of items involved (I), and the time stamp of the last pull time (T) associated with the one or more customer data in the one or more customer specific stores 114A-N and uses that tracked information to fetch incremental data from one or more customer specific stores 114A-N to update the cross customer metrics based on the incremental data, avoiding the need to recompute metrics by going through the entire data.

In one embodiment, the incremental data updation module 206 automatically determines N new items associated with the incremental data. The incremental data updation module 206 automatically updates existing minimum or maximum metrics by comparing the existing minimum or maximum metrics with the N new items. The incremental data updation module 206 further automatically updates existing sum metrics by adding the N new items. The incremental data updation module 206 further automatically updates existing count metrics by adding the number (N) of new items. The incremental data updation module 206 further automatically updates existing average metrics by computing an average with the N new items by dividing a sum of (a) a product of existing average and the number of items involved (I), and (b) a sum of the N new items, with the sum of the number of N new items and the number of items (I). The incremental data updation module 206 further automatically increments the number of items (I) by the number of N new items.

In yet another embodiment, the incremental data updation module 206 is configured to automatically determine U updated items associated with the incremental data. The incremental data updation module 206 further automatically updates the existing sum metrics by subtracting a sum of old values of the U updated items and adding a sum of new values of the U updated items to the existing sum. The incremental data updation module 206 further automatically compares (a) existing minimum or maximum values with the new values of the U updated items when the existing minimum or maximum values are not updated, or (b) updated values of the minimum or maximum items with a first minimum or maximum value that is stored as part of an ordered list of preconfigured number of next minimum and maximum values. The incremental data updation module 206 further automatically updates the minimum or maximum values to (a) the updated value of the minimum or maximum metrics, or (b) the first of the ordered list of stored next minimums or maximums values by removing the first of the stored minimum or maximum value. The incremental data updation module 206 further automatically updates the existing average metrics by computing an average with the U updated items by dividing a difference of (a) a product of the existing average and the number of items involved (I) and the sum of new values of the U updated items, and (b) the sum of old values of the U updated items, with the number of items (I).

In yet another embodiment, the incremental data updation module 206 is configured to automatically determine D deleted items associated with the incremental data. The incremental data updation module 206 further automatically updates the existing sum metrics by subtracting a sum of D deleted items. The incremental data updation module 206 further automatically updates the existing minimum or maximum metrics, if the minimum or maximum value is deleted, by removing a first of the ordered list of stored next minimum and maximum values, and setting the first removed stored minimum or maximum as the new minimum or maximum metric value. The incremental data updation module 206 further automatically updates the existing count metrics by subtracting the number of D deleted items. The incremental data updation module 206 further automatically updates the existing average metrics by computing an average with the D deleted items by dividing a difference of (a) a product of the existing average and the number of items involved (I), and (b) the sum of deleted values of the D deleted items, with a difference of the number of items (I) and the number of D deleted items. The incremental data updation module 206 further automatically decrements the number of items (I) by the number of the deleted items D.

In yet another embodiment, the incremental data updation module 206 is further configured to automatically update a counter array tracking each items count, with the N new items by (a) adding ND new distinct values associated with the N new items and (b) incrementing a count for existing values. The incremental data updation module 206 further automatically updates existing count distinct metrics by incrementing the count distinct with a number of ND new distinct values. The incremental data updation module 206 further automatically updates existing sum distinct metrics by incrementing the sum distinct with a sum of the ND new distinct values. The incremental data updation module 206 further automatically updates existing average distinct metrics by dividing a sum of (a) a product of the average distinct and a count of total distinct values (ID), and (b) a sum of the ND new distinct values, with the sum of the number of ND new distinct values, and the count of total distinct values (ID). The incremental data updation module 206 further automatically updates the count of previous total distinct values (ID) by incrementing with the number of ND new distinct values.

In yet another embodiment, the incremental data updation module 206 is further configured to automatically update the counter array tracking each items count, with the U updated items by (a) adding new values associated with the U updated items, (b) incrementing a count of existing values, (c) decrementing a count of removed values, and (d) tracking the ND new distinct values and DD deleted distinct values. The incremental data updation module 206 further automatically updates the existing count distinct metrics by (a) incrementing with the number of ND new distinct values, and (b) decrementing by a number of DD deleted distinct values to obtain a new count distinct. The incremental data updation module 206 further automatically updates the existing sum distinct metrics by (a) reducing a sum of DD deleted distinct values and (b) adding a sum of the ND new distinct values associated with the U updated items. The incremental data updation module 206 further automatically updates the existing average distinct metrics by dividing a difference of (a) a product of the existing average distinct and the count of total distinct values (ID), and a sum of the ND new distinct values, and (b) a sum of the DD deleted distinct values associated with the U updated items, with the new count distinct. The incremental data updation module 206 further automatically updates the count of previous total distinct values (ID) by (a) incrementing with the number of ND new distinct values, and (b) decrementing with the number of DD deleted distinct values.

In yet another embodiment, the incremental data updation module 206 is configured to automatically update the counter array tracking each items count, by (a) decrementing the count of the removed values, and (b) tracking the DD deleted distinct values where the count drops to 0. The incremental data updation module 206 further automatically updates the existing count distinct metrics by decrementing the count of the DD deleted distinct values. The incremental data updation module 206 further automatically updates the existing sum distinct metrics by decrementing the sum of the DD distinct deleted values. The incremental data updation module 206 further automatically updates the existing average distinct metrics by dividing a difference of (a) a product of the existing average distinct and the count of total distinct values (ID), and (b) a sum of the DD deleted distinct values, with a difference of the count of total distinct values (ID) and the DD deleted values. The incremental data updation module 206 further automatically updates the count of previous total distinct values (ID) by decrementing with the number of DD deleted distinct values.

The peer groups creation module 208 is configured to determine one or more parameters such as a kind of application used, an industry, a geography, a customer size in terms of employees, a revenue, or relevant data volumes associated with one or more customers when the one or more customers are setup. The peer groups creation module 208 automatically creates one or more peer groups at run time based on specified values selected for one or more of the parameters such as a kind of application used, an industry, a geography, a customer size in terms of employees, a revenue, or relevant data volumes associated with each of one or more customers. In one embodiment, the peer groups creation module 208 automatically determines data points for the relevant data volumes associated with the one or more customer data. The peer groups creation module 208 further creates the one or more peer groups, using standard clustering algorithms to segment the one or more customers into the peer groups based on identified clusters of data points. The peer groups creation module 208 further updates the one or more cross customer metrics, and the one or more peer groups in the cross customer store 112 when a new customer is setup. The peer groups creation module 208 further computes a list of the customer specific stores 114A-N based on the specified values of the one or more parameters (i.e. a kind of application used, an industry, a geography, a customer size in terms of employees, a revenue, or relevant data volumes) to retrieve one or more customer specific facts from the list of customer specific stores 114A-N, and compute the one or more cross customer metrics at run time for the list of customer specific stores 114A-N. In one embodiment, the peer groups creation module 208 analyzes the one or more cross customer metrics based on dimensions such as time, geography, and the like.

The cross customer metrics comparison module 210 is configured to automatically compare the one or more comparable cross customer metrics of the one or more customer with at least one peer group that includes a number of customers that exceeds a minimum threshold value, for cross customer analytics.

Figure 3:
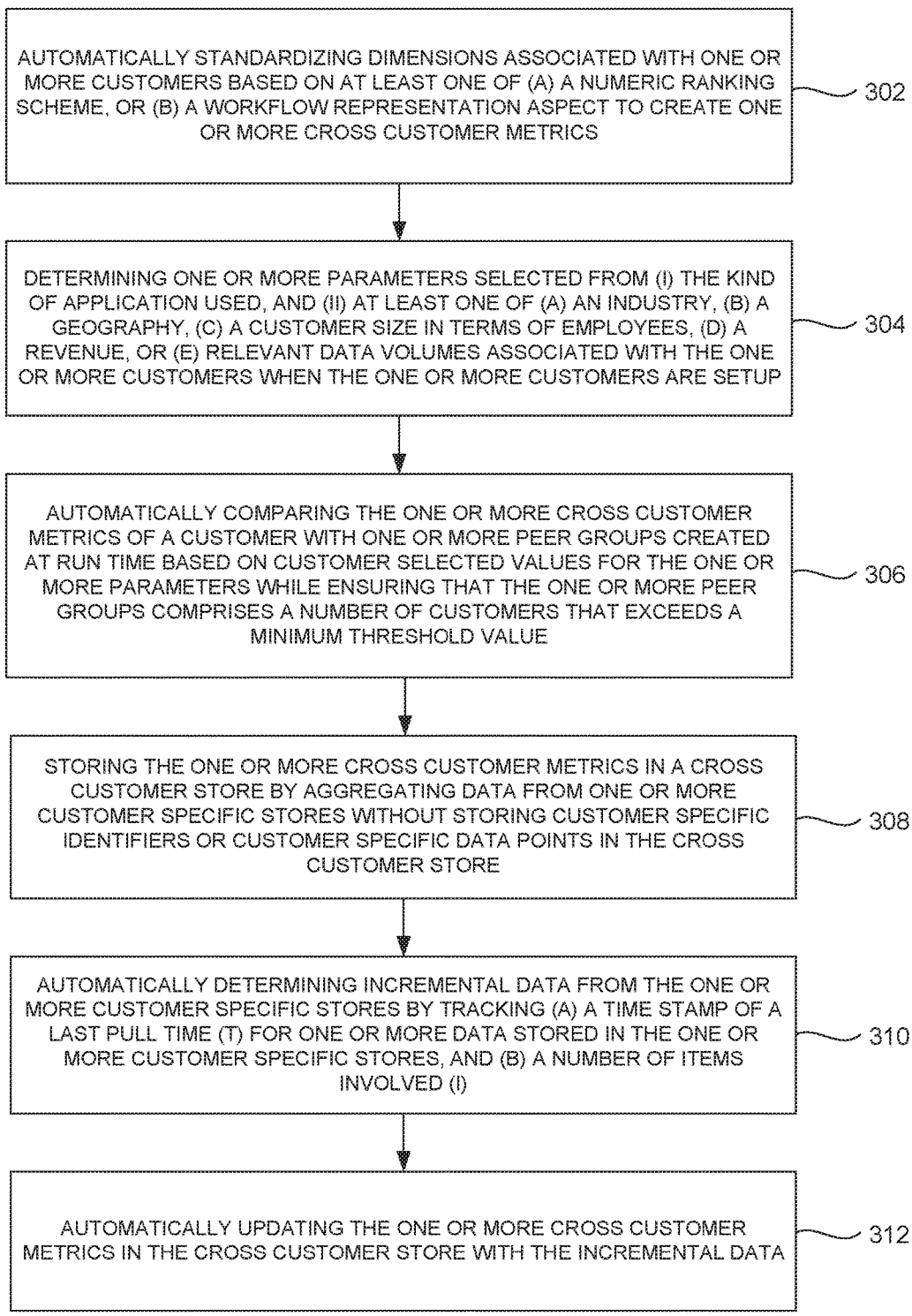
FIG. 3 is a flow diagram illustrating a method of automatically determining one or more cross customer metrics from a cross customer store for cross customer analytics according to an embodiment herein.

FIG. 3 is a flow diagram illustrating a method of automatically determining one or more cross customer metrics from a cross customer store for cross customer analytics according to an embodiment herein. At step 302, the dimension standardization module 203 automatically standardizes dimensions associated with the one or more customers based on at least one of (a) a numeric ranking scheme, or (b) a workflow representation aspect to create one or more cross customer metrics. At step 304, the peer groups creation module 208 determines one or more parameters selected from (i) the kind of application used, and (ii) at least one of (a) an industry, (b) a geography, (c) a customer size in terms of employees, (d) a revenue, or (e) relevant data volumes associated with the one or more customers when the one or more customers are setup. At step 306, the cross customer metrics comparison module 210 automatically compares the one or more cross customer metrics of a customer with the one or more peer groups created at run time based on customer selected values for the one or more parameters while ensuring that each of the one or more peer group includes a number of customers that exceeds a minimum threshold value. At step 308, the automated cross customer analytics system 106 stores the one or more cross customer metrics in the cross customer store 112 by aggregating data from the one or more customer specific stores 114A-N without storing customer specific identifiers or customer specific data points in the cross customer store 112. At step 310, the incremental data determination module 204 automatically determines incremental data from the one or more customer specific stores 114A-N by tracking (a) a time stamp of a last pull time (T) for the data stored in the one or more customer specific stores 114A-N, and (b) a number of items involved (I). At step 312, the incremental data upda-tion module 206 automatically updates the one or more cross customer metrics in the cross customer store 112 with the incremental data.

With reference to FIGS. 1 through 3, FIG. 4 is a flow diagram illustrating a method of automatically updating existing metrics with N new items associated with the incremental data in the cross customer store 112 according to an embodiment herein. At step 402, the incremental data updation module 206 automatically determines N new items associated with the incremental data. At step 404, the incremental data updation module 206 automatically updates existing minimum or maximum metrics by comparing the existing minimum or maximum metrics with the N new items. At step 406, the incremental data updation module 206 automatically updates existing sum metrics by adding the N new items. At step 408, the incremental data updation module 206 automatically updates existing count metrics by adding a number of N new items. At step 410, the incremental data updation module 206 automatically updates existing average metrics by computing an average with the N new items by dividing a sum of (a) a product existing average and the number of items involved (I), and (b) a sum of the N new items, with the sum of the number of N new items and the number of items (I). At step 412, the incremental data updation module 206 automatically increments the number of items (I) by the number of N new items.

With reference to FIGS. 1 through 4, FIG. 5 is a flow diagram illustrating a method of automatically updating existing metrics with U updated items associated with the incremental data in the cross customer store 112 according to an embodiment herein. At step 502, the incremental data updation module 206 automatically determines U updated items associated with the incremental data. At step 504, the incremental data updation module 206 automatically updates existing sum metrics by subtracting a sum of old values of the U updated items and adding a sum of new values of the U updated items to the existing sum. At step 506, the incremental data updation module 206 automatically (i) compares (a) existing minimum or maximum values with the new values of the U updated items when the existing minimum or maximum values are not updated, or (b) updated values of minimum or maximum items with a first minimum or maximum value that is stored as part of an ordered list of preconfigured number of next minimum and maximum values, and (ii) updates a minimum or maximum value to (a) the updated value of the minimum or maximum items, or (b) the first of the ordered list of stored next minimum or maximum values by removing the first of the stored minimum or maximum value. At step 508, the incremental data updation module 206 automatically updates an existing average metrics by computing an average with the U updated items by dividing a difference of (a) a product of the existing average and the number of items involved (I) and the sum of new values of the U updated items, and (b) the sum of old values of the U updated items, with the number of items (I).

With reference to FIGS. 1 through 5, FIG. 6 is a flow diagram illustrating a method of automatically updating existing metrics with D deleted items associated with the incremental data in the cross customer store 112 according to an embodiment herein. At step 602, the incremental data updation module 206 automatically determines D deleted items associated with the incremental data. At step 604, the incremental data updation module 206 automatically updates existing sum metrics by subtracting a sum of D deleted items. At step 606, the incremental data updation module 206 automatically updates the existing minimum or maximum metrics, when a minimum or maximum value is deleted, by removing a first of the ordered list of stored next minimum and maximum values, and setting the first removed stored minimum or maximum as a new minimum or maximum metric value. At step 608, the incremental data updation module 206 automatically updates existing count metrics by subtracting a number of D deleted items. At step 610, the incremental data updation module 206 automatically updates existing average metrics by computing an average with the D deleted items by dividing a difference of (a) a product of the existing average and the number of items involved (I), and (b) the sum of deleted values of the D deleted items, with a difference of the number of items (I) and the number of D deleted items. At step 612, the incremental data updation module 206 automatically decrements the number of items (I) by the number of the deleted items D.

Figure 4:
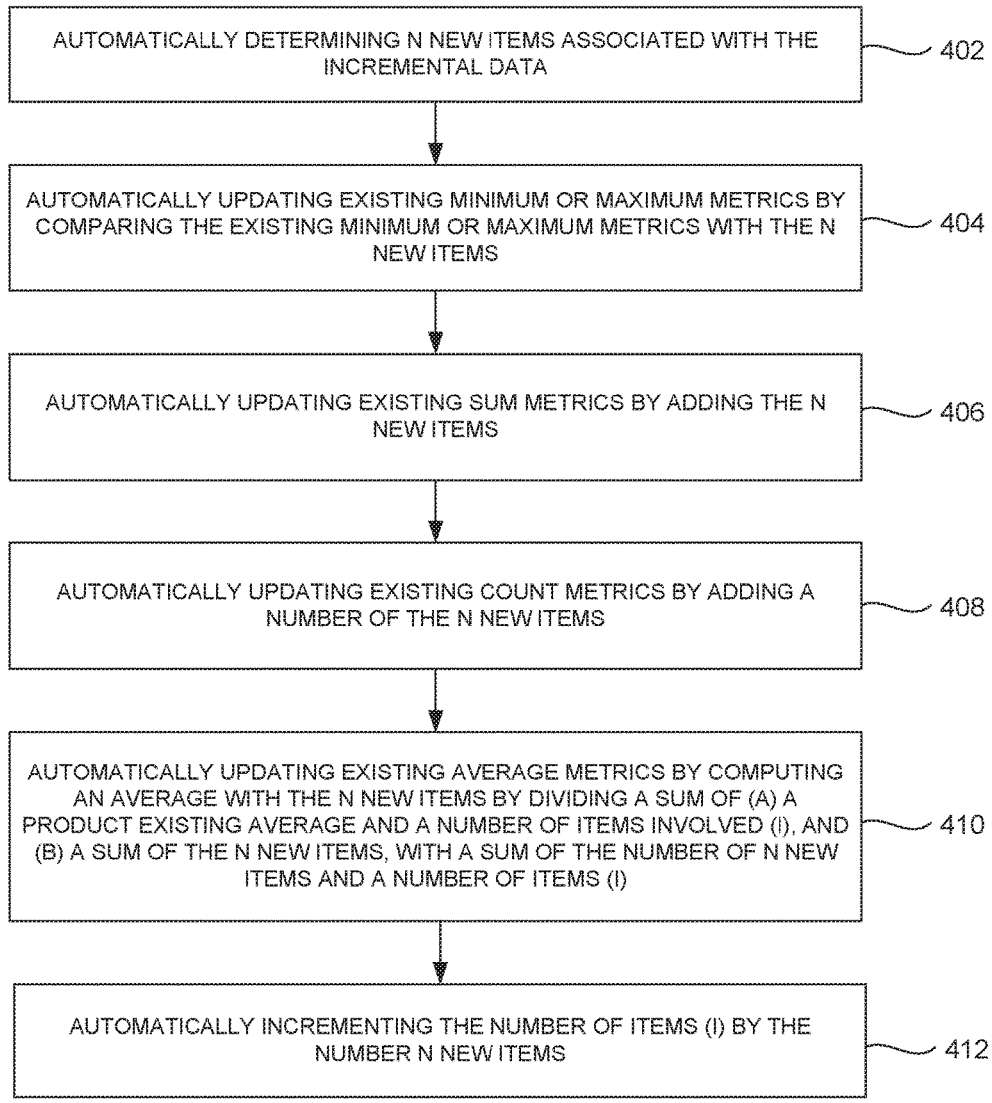
FIG. 4 is a flow diagram illustrating a method of automatically updating existing metrics with N new items associated with the incremental data in the cross customer store of FIG. 1 according to an embodiment herein.
Figure 7:
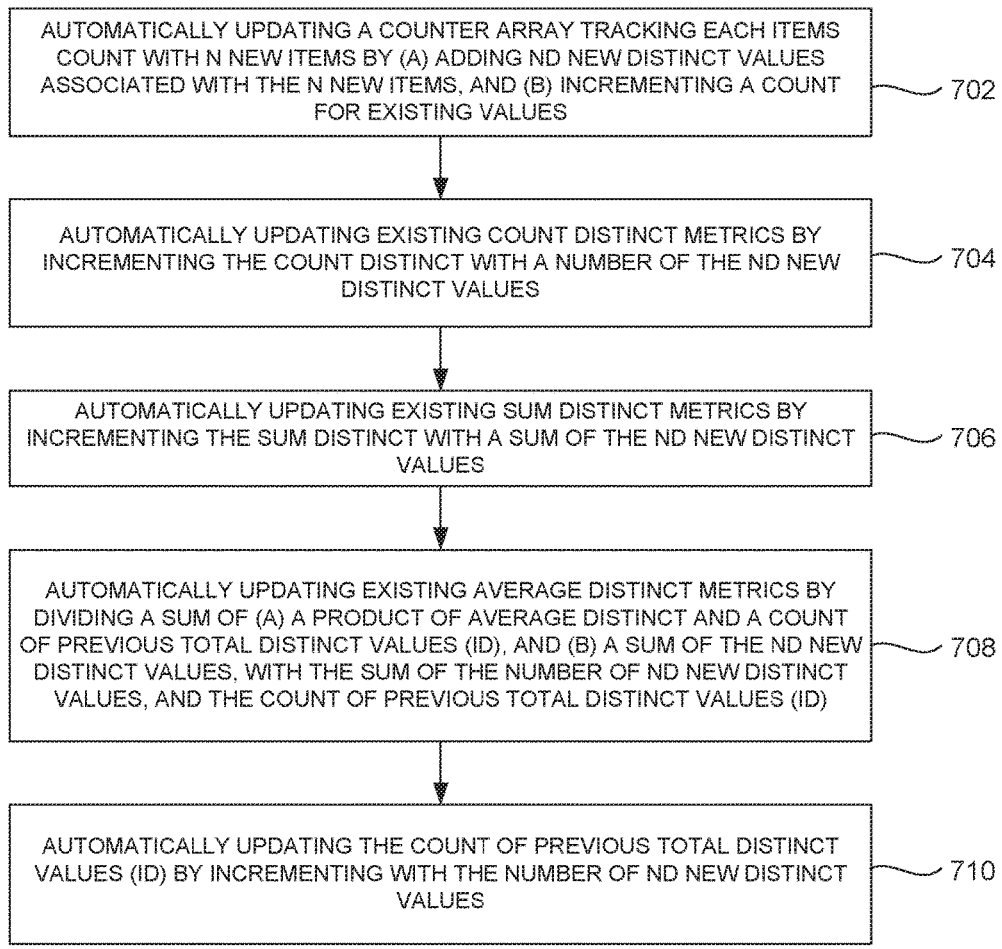
FIG. 7 is a flow diagram illustrating a method for automatically updating existing metrics using distinct aggregates with the N new items in the cross customer store of FIG. 1 according to an embodiment herein.

With reference to FIG. 4, FIG. 7 is a flow diagram illustrating a method for automatically updating existing metrics using distinct aggregates with the N new items in the cross customer store 112 according to an embodiment herein. At step 702, the incremental data updation module 206 automatically updates a counter array tracking each items count with the N new items by (a) adding ND new distinct values associated with the N new items, and (b) incrementing a count for existing values. At step 704, the incremental data updation module 206 automatically updates existing count distinct metrics by incrementing the count distinct with a number of ND new distinct values. At step 706, the incremental data updation module 206 automatically updates existing sum distinct metrics by incrementing the sum distinct with a sum of the ND new distinct values. At step 708, the incremental data updation module 206 automatically updates existing average distinct metrics by dividing a sum of (a) a product of the average distinct and a count of total distinct values (ID), and (b) a sum of the ND new distinct values, with the sum of the number of ND new distinct values, and the count of total distinct values (ID). At step 710, the incremental data updation module 206 automatically updates the count of previous total distinct values (ID) by incrementing with a number of ND new distinct values.

Figure 5:
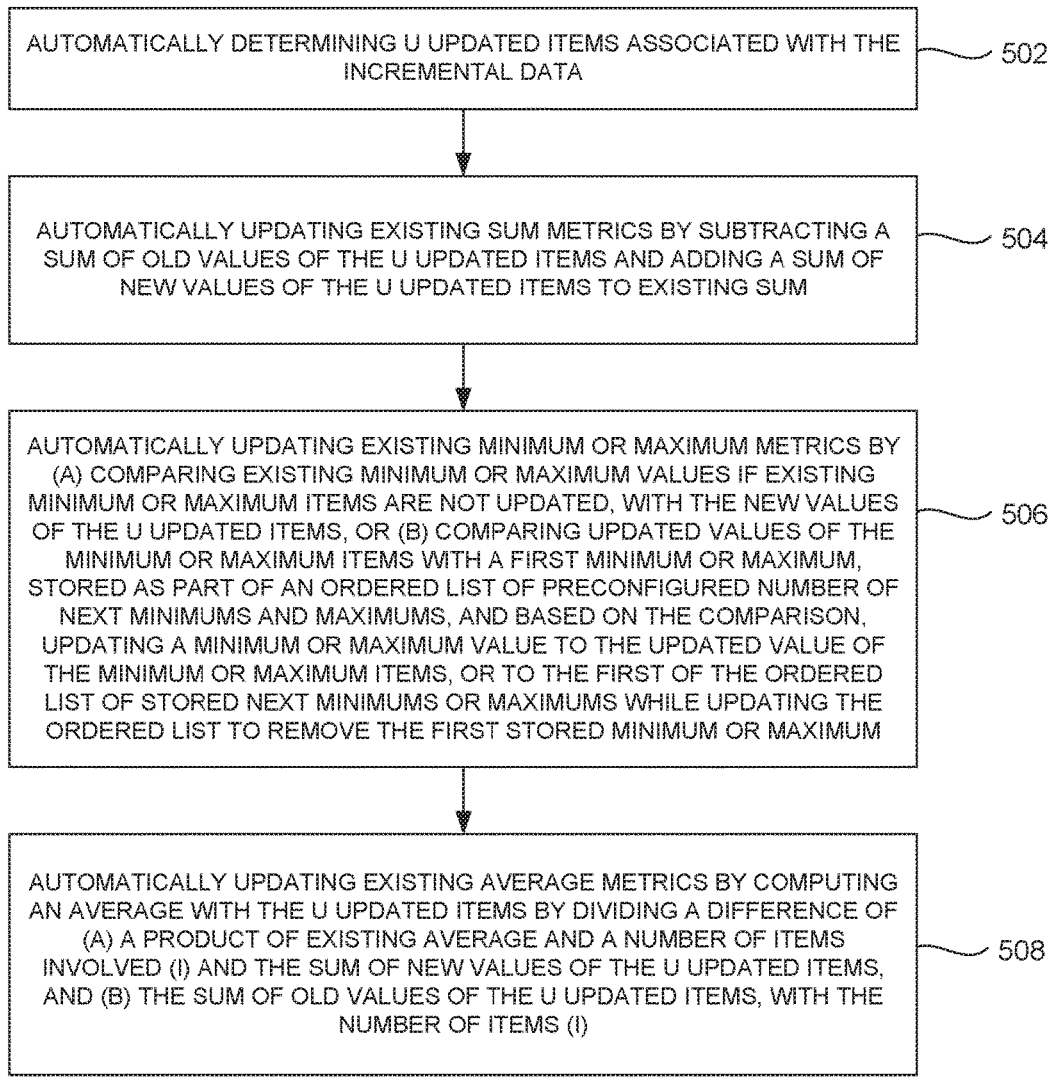
FIG. 5 is a flow diagram illustrating a method of automatically updating existing metrics with U updated items associated with the incremental data in the cross customer store of FIG. 1 according to an embodiment herein.
Figure 8:
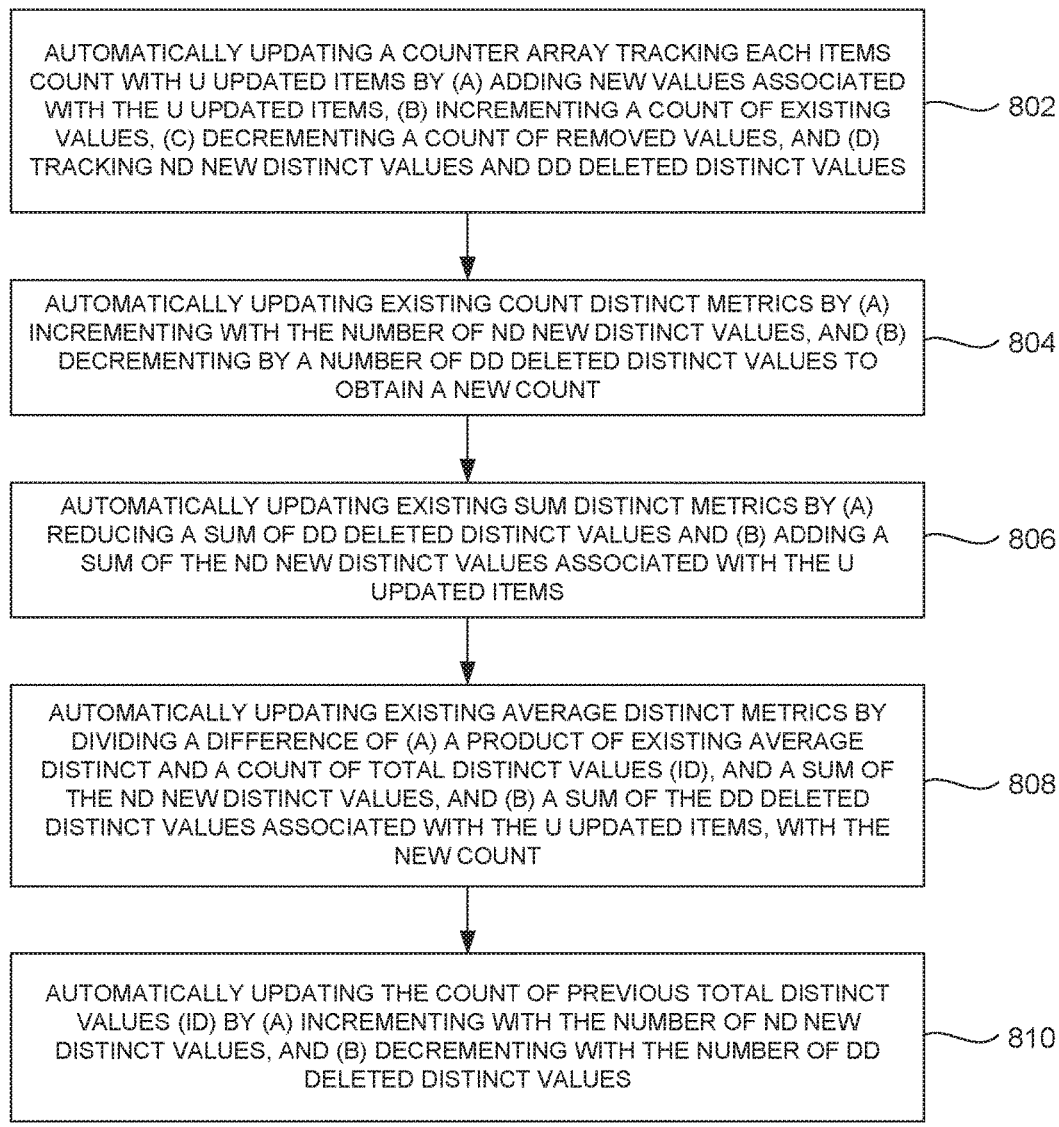
FIG. 8 is a flow diagram illustrating a method for automatically updating existing metrics using distinct aggregates with the U updated items in the cross customer store of FIG. 1 according to an embodiment herein.

With reference to FIG. 5, FIG. 8 is a flow diagram illustrating a method for automatically updating existing metrics using distinct aggregates with the U updated items in the cross customer store 112 according to an embodiment herein. At step 802, the incremental data updation module 206 automatically updates the counter array tracking each items count, with U updated items by (a) adding new values associated with the U updated items, (b) incrementing a count of existing values, (c) decrementing a count of removed values, and (d) tracking ND new distinct values and DD deleted distinct values. At step 804, the incremental data updation module 206 automatically updates the existing count distinct metrics by (a) incrementing with the number of ND new distinct values, and (b) decrementing by a number of DD deleted distinct values to obtain a new count distinct. At step 806, the incremental data updation module 206 automatically updates the existing sum distinct metrics by (a) reducing a sum of DD deleted distinct values and (b) adding a sum of the ND new distinct values associated with the U updated items. At step 808, the incremental data updation module 206 automatically updates the existing average distinct metrics by dividing a difference of (a) a product of the existing average distinct and the count of total distinct values (ID), and (b) a sum of the ND new distinct values, and (b) a sum of the DD deleted distinct values associated with the U updated items, with the new count distinct. At step 810, the incremental data updation module 206 automatically updates the count of previous total distinct values (ID) by (a) incrementing with the number of ND new distinct values, and (b) decrementing with the number of DD deleted distinct values.

Figure 6:
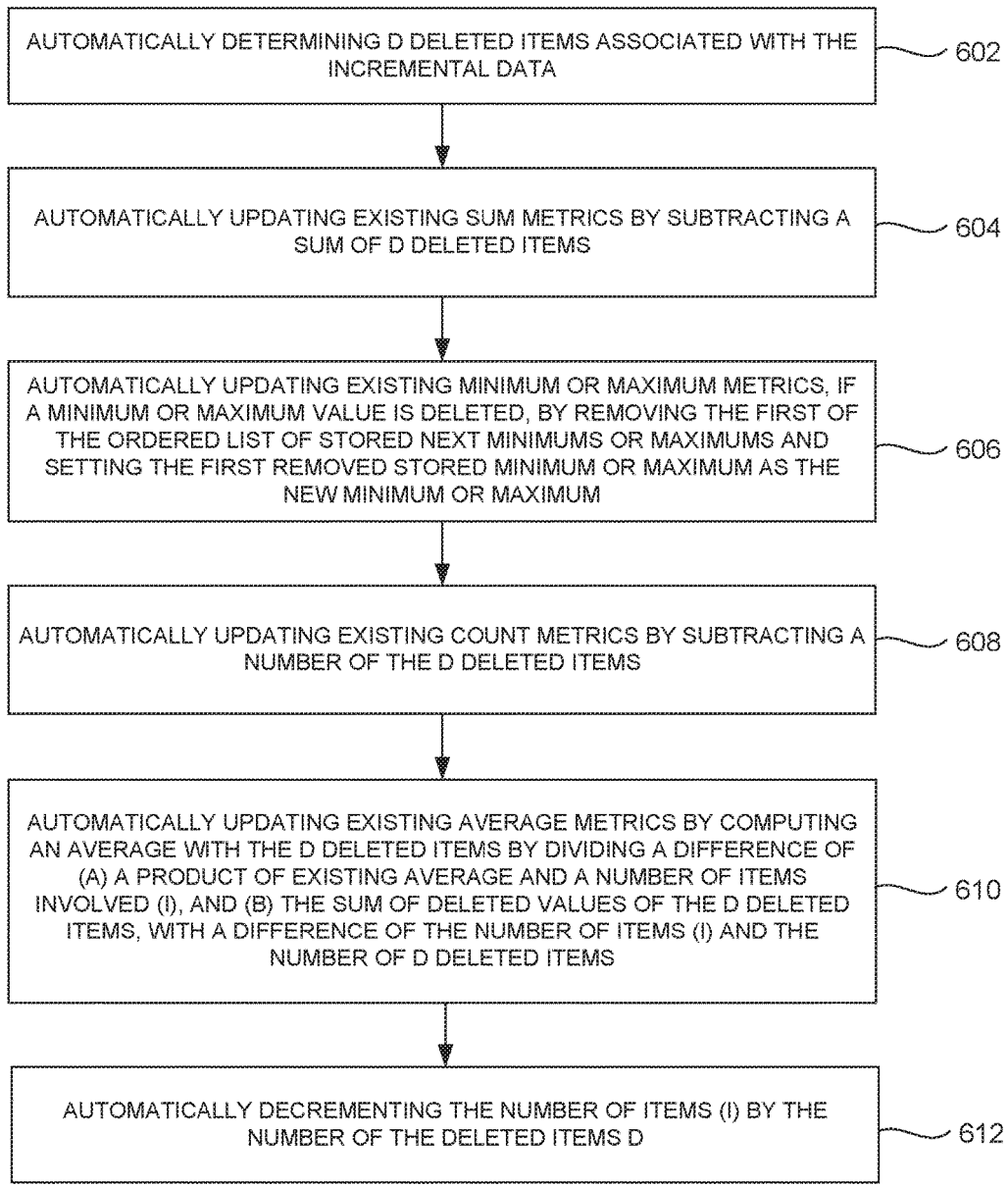
FIG. 6 is a flow diagram illustrating a method of automatically updating existing metrics with D deleted items associated with the incremental data in the cross customer store of FIG. 1 according to an embodiment herein.
Figure 9:
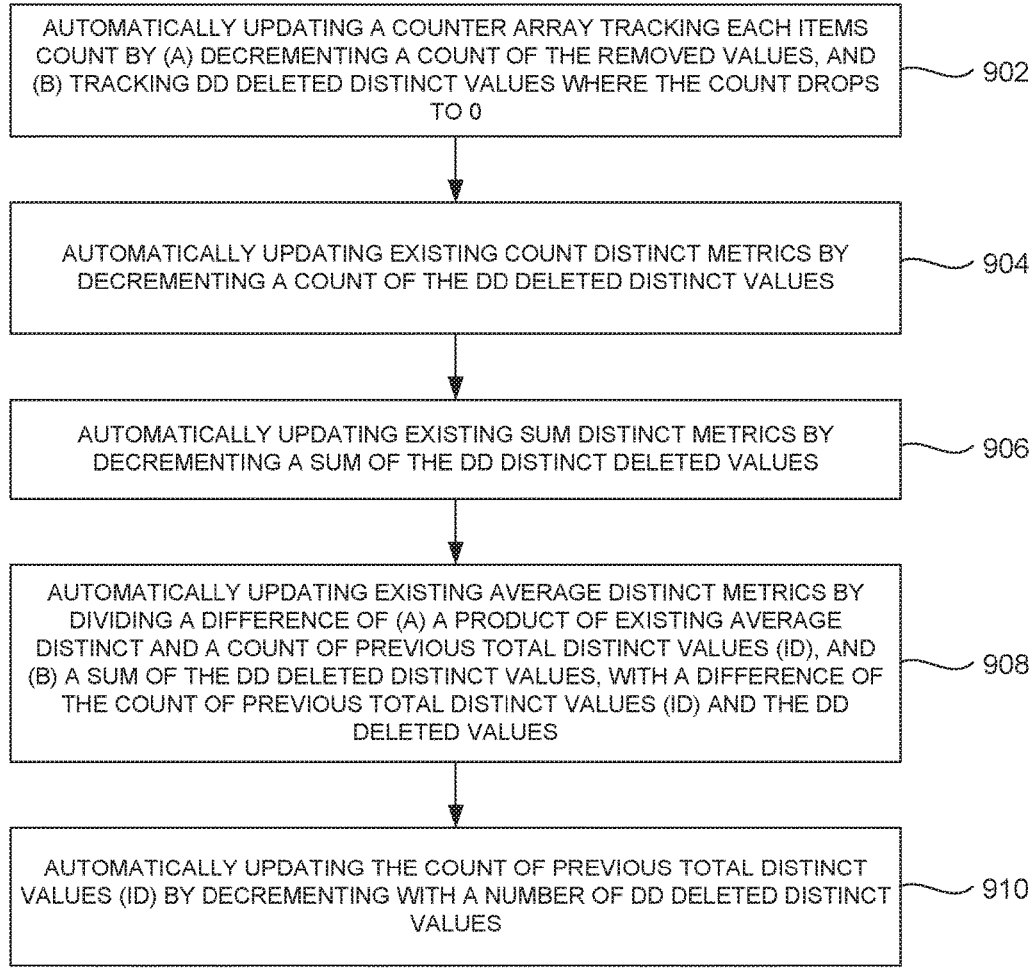
FIG. 9 is a flow diagram illustrating a method for automatically updating existing metrics using distinct aggregates with the D deleted items in the cross customer store of FIG. 1 according to an embodiment herein.

With reference to FIG. 6, FIG. 9 is a flow diagram illustrating a method for automatically updating existing metrics using distinct aggregates with the D deleted items in the cross customer store 112 according to an embodiment herein. At step 902, the incremental data updation module 206 automatically updates the counter array tracking each items count, by (a) decrementing a count of the removed values, and (b) tracking the DD deleted distinct values where the count drops to 0. At step 904, the incremental data updation module 206 automatically updates the existing count distinct metrics by decrementing the count of the DD deleted distinct values. At step 906, the incremental data updation module 206 automatically updates the existing sum distinct metrics by decrementing a sum of the DD distinct deleted values. At step 908, the incremental data updation module 206 automatically updates the existing average distinct metrics by dividing a difference of (a) a product of the existing average distinct and the count of total distinct values (ID), and (b) a sum of the DD deleted distinct values, with a difference of the count of total distinct values (ID) and the DD deleted values. At step 910, the incremental data updation module 206 automatically updates the count of previous total distinct values (ID) by decrementing with the number of DD deleted distinct values.

FIG. 10, with reference to FIGS. 1 through 9, is the computer system 104 of FIG. 1 used in accordance with the embodiments herein. The computer system 104 includes one or more of a personal computer, a laptop, a tablet device, a smartphone, a mobile communication device, a personal digital assistant, or any other such computing device, in one example embodiment, in another example embodiment. This schematic drawing illustrates a hardware configuration of an information handling/computer system in accordance with the embodiments herein. The system includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The automated cross customer analytics system 106 provides options to organizations/other business sectors to efficiently compare their performance with peers to know the performance of the organizations/business sectors for a particular time period (e.g. a performance for financial year 2014-2015), and/or a growth of the organization/business sector. The automated cross customer analytics system 106 updates the one or more cross customer metrics in the cross customer store 112 by retrieving updated values from the one or more customer specific stores 114A-N. The automated cross customer analytics system 106 stores the one or more cross updated customer metrics in the cross customer store 112 for subsequent access. The automated cross customer analytics system 106 efficiently updates the cross customer metrics with the incremental data associated with the one or more customers. The automated cross customer analytics system 106 provides access to the cross customer store for all the customers without compromising data privacy.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, cause automatic determination of a plurality of cross customer metrics from a cross customer database for each of a plurality of customers and providing the plurality of cross customer metrics to an analytics tool for cross customer analytics, by:
   generating a cross customer database with a plurality of cross customer metrics by aggregating data from a plurality of customer specific databases without storing customer specific identifiers or customer specific data points in the cross customer database, wherein the data is obtained from the plurality of customer specific databases through a network;
   ensuring, by a dimension standardization module, that the plurality of cross customer metrics are comparable by standardizing dimensions of the plurality of cross customer metrics associated with the plurality of customers at the cross customer database based on at least one of a numeric ranking scheme, or a workflow representation aspect;
   automatically determining, by an incremental data determination module, incremental data from the plurality of customer specific databases by tracking (a) a time stamp of a last pull time (T) for a plurality of customer data stored in the plurality of customer specific databases, and (b) a number of items involved (I);
   automatically updating, by an incremental data updation module, the plurality of cross customer metrics in the cross customer database with the incremental data for subsequent access thereby allowing the one or more processors to avoid (i) recomputing the cross customer metrics over an entire data stored in the cross customer database, and (ii) searching the incremental data in the plurality of customer specific databases, wherein the automatically updating comprises:
      automatically determining N new items associated with the incremental data and at least one of: (i) automatically updating existing minimum or maximum metrics by comparing the existing minimum or maximum metrics with the N new items, (ii) automatically updating existing sum metrics by adding the N new items, (iii) automatically updating existing count metrics by adding a number of N new items or (iv) automatically updating existing average metrics by computing an average with the N new items by dividing a sum of (a) a product of existing average and the number of items involved (I), and (b) a sum of the N new items, with the sum of the number of the N new items and the number of items (I); and
      automatically incrementing the number of items (I) by the number of N new items;
   determining, by a peer groups creation module, a plurality of parameters selected from (i) a kind of application used, and (ii) at least one of (a) an industry, (b) a geography, (c) a customer size in terms of employees, (d) a revenue, or (e) relevant data volumes associated with a plurality of customers when the plurality of customers are setup;
   generating, by the peer groups creation module, a plurality of peer groups at run time based on customer selected values for the plurality of parameters while ensuring that the plurality of peer groups comprise a number of customers that exceeds a minimum threshold value;
   automatically comparing, by a cross customer metrics comparison module, the plurality of comparable cross customer metrics of a customer with a plurality of peer groups created at run time based on customer selected values for the plurality of parameters for the practical application of analyzing a performance of the customer against said peer groups based on the cross customer metrics, without comingling customer specific identifiers or customer specific data points, wherein the cross customer metrics comparison module receives the plurality of comparable cross customer metrics refreshed based on the incremental data upon update of the plurality of cross customer metrics with the incremental data in the cross customer database.

2. The one or more non-transitory computer readable storage mediums storing one or more sequences of instructions of claim 1, which when executed by the one or more processors, further cause the peer groups creation module to automatically (i) determine data points for the relevant data volumes associated with the plurality of customer data, (ii) create the plurality of peer groups using standard clustering algorithms to segment the plurality of customers into the peer groups based on identified clusters of data points, and (iii) update (a) the plurality of cross customer metrics, and (b) the plurality of peer groups in the cross customer database when a new customer is setup.

3. The one or more non-transitory computer readable storage mediums storing one or more sequences of instructions of claim 1, which when executed by the one or more processors, further cause the dimension standardization module to automatically standardize the numeric ranking scheme across the plurality of customers by (i) determining a standard numeric ranking across the plurality of customers, (ii) mapping non-standard numeric ranking schemes to the standard numeric ranking scheme, based on an analysis of value distributions in the non-standard numeric ranking schemes, to create groupings in the non-standard numeric ranking schemes by (a) identifying an average value distribution of values in the standard numeric ranking scheme, and (b) identifying a grouping that brings the non-standard numeric ranking schemes similar to the standard numeric ranking scheme in terms of value distributions.

4. The one or more non-transitory computer readable storage mediums storing one or more sequences of instructions of claim 1, which when executed by the one or more processors, further cause the dimension standardization module to automatically standardize the workflow representation aspects by (i) determining a closed versus active state for workflows for standardizing closed to active transitions, (ii) standardizing duration determination for workflows, and (iii) standardizing determination of ownership changes for workflows across the plurality of customers.

5. The one or more non-transitory computer readable storage mediums storing one or more sequences of instructions of claim 4, which when executed by the one or more processors, further cause the dimension standardization module to automatically determine the closed workflow state by identifying at least one of (a) an explicit enumerated value of attributes associated with the closed workflow state, or (b) a workflow state attribute value without any updates to workflow records.

6. The one or more non-transitory computer readable storage mediums storing one or more sequences of instructions of claim 4, which when executed by the one or more processors, further cause the dimension standardization module to automatically determine how duration of workflows is represented across the plurality of customers by identifying at least one of (a) a start time and an end time, (b) a start time and a duration, (c) an end time and a duration, or (d) a duration associated with workflows for each customer.

7. The one or more non-transitory computer readable storage mediums storing one or more sequences of instructions of claim 4, which when executed by the one or more processors, further cause the dimension standardization module to automatically determine the ownership changes for workflows across the plurality of customers by identifying for each customer a string column that captures a name representing owners of workflows, or an id/a foreign key to a record that captures a name representing owners of workflows.

8. The one or more non-transitory computer readable storage mediums storing one or more sequences of instructions of claim 1, which when executed by the one or more processors, further cause the incremental data updation module to automatically:
determine U updated items associated with the incremental data; and
update at least one of:
(i) the existing sum metrics by subtracting a sum of old values of the U updated items and adding a sum of new values of the U updated items to the existing sum;
(ii) the existing minimum or maximum metrics by (a) comparing existing minimum or maximum values if existing minimum or maximum items are not updated, with the new values of the U updated items, or (b) comparing updated values of the minimum or maximum items with a first minimum or maximum, stored as part of an ordered list of preconfigured number of next minimums and maximums, and based on the comparison, updating the minimum or maximum metric values to the updated value of the minimum or maximum items, or the first of the ordered list of stored next minimums or maximums while updating the ordered list to remove the first stored minimum or maximum; or
(iii) the existing average metrics by computing an average with the U updated items by dividing a difference of (a) a product of the existing average and the number of items involved (I) and the sum of new values of the U updated items, and (b) the sum of old values of the U updated items, with the number of items (I).

9. The one or more non-transitory computer readable storage mediums storing one or more sequences of instructions of claim 8, which when executed by the one or more processors, further cause the incremental data updation module to automatically:
determine D deleted items associated with the incremental data;
update at least one of:
(i) the existing sum metrics by subtracting a sum of D deleted items;
(ii) existing minimum or maximum metrics, if a minimum or maximum value is deleted, by removing the first of the ordered list of stored next minimums or maximums and setting the first removed stored minimum or maximum as the new minimum or maximum;
(iii) the existing count metrics by subtracting the number of D deleted items; or
(iv) the existing average metrics by computing an average with the D deleted items by dividing a difference of (a) a product of the existing average and the number of items involved (I), and (b) the sum of deleted values of the D deleted items, with a difference of the number of items (I) and the number of D deleted items; and
decrement the number of items (I) by the number of the deleted items.

10. The one or more non-transitory computer readable storage mediums storing one or more sequences of instructions of claim 9, which when executed by the one or more processors, further cause the incremental data updation module to:
(i) automatically update a counter array tracking each items count, with the N new items by (a) adding ND new distinct values associated with the N new items, and (b) incrementing a count for existing values;
(ii) automatically update existing count distinct metrics by incrementing the count distinct with a number of ND new distinct values;
(iii) automatically update existing sum distinct metrics by incrementing the sum distinct with a sum of the ND new distinct values;
(iv) automatically update existing average distinct metrics by dividing a sum of (a) a product of the average distinct and a count of total distinct values (ID), and (b) a sum of the ND new distinct values, with the sum of the number of ND new distinct values, and the count of total distinct values (ID); and
(v) automatically update the count of previous total distinct values (ID) by incrementing with the number of ND new distinct values.

11. The one or more non-transitory computer readable storage mediums storing one or more sequences of instructions of claim 10, which when executed by the one or more processors, further cause the incremental data updation module to:
(i) automatically update the counter array tracking each items count, with the U updated items by (a) adding new values associated with the U updated items, (b) incrementing a count of existing values, (c) decrementing a count of removed values, and (d) tracking the ND new distinct values and DD deleted distinct values;

(ii) automatically update the existing count distinct metrics by (a) incrementing with the number of ND new distinct values, and (b) decrementing by a number of DD deleted distinct values to obtain a new count distinct;

(iii) automatically update the existing sum distinct metrics by (a) reducing a sum of DD deleted distinct values and (b) adding a sum of the ND new distinct values associated with the U updated items;

(iv) automatically update the existing average distinct metrics by dividing a difference of (a) a product of the existing average distinct and the count of total distinct values (ID), and a sum of the ND new distinct values, and (b) a sum of the DD deleted distinct values associated with the U updated items, with the new count distinct; and (v) automatically update the count of total distinct values (ID) by (a) incrementing with the number of ND new distinct values, and (b) decrementing with the number of DD deleted distinct values.

12. The one or more non-transitory computer readable storage mediums storing one or more sequences of instructions of claim 11, which when executed by the one or more processors, further cause the incremental data updation module to:

(i) automatically update the counter array tracking each items count by (a) decrementing the count of the removed values, and (b) tracking the DD deleted distinct values where the count drops to 0;

(ii) automatically update the existing count distinct metrics by decrementing the count of the DD deleted distinct values;

(iii) automatically update the existing sum distinct metrics by decrementing the sum of the DD distinct deleted values;

(iv) automatically update the existing average distinct metrics by dividing a difference of (a) a product of the existing average distinct and the count of total distinct values (ID), and (b) a sum of the DD deleted distinct values, with a difference of the count of total distinct values (ID) and the DD deleted values; and (v) automatically update the count of previous total distinct values (ID) by decrementing with a number of DD deleted distinct values.

13. The one or more non-transitory computer readable storage mediums storing one or more sequences of instructions of claim 1, which when executed by the one or more processors, further cause the peer groups creation module to automatically compute a list of customer specific databases based on the plurality of parameters to (a) retrieve a plurality of customer specific facts from the list of customer specific databases, and (b) compute the plurality of cross customer metrics at run time for the list of customer specific databases.

* * * * *